United States Patent [19]

Foti

[11] Patent Number: 5,974,309
[45] Date of Patent: Oct. 26, 1999

[54] METHOD AND APPARATUS FOR FACILITATING LAW ENFORCEMENT AGENCY MONITORING OF CELLULAR TELEPHONE CALLS

[75] Inventor: George Foti, Dollard Des Ormeaux, Canada

[73] Assignee: Telefonaktiebolaget L M Ericsson (publ), Stockholm, Sweden

[21] Appl. No.: 08/642,482

[22] Filed: May 3, 1996

[51] Int. Cl.⁶ ..................... H04Q 7/20
[52] U.S. Cl. ............ 455/412; 455/414; 455/415
[58] Field of Search ............ 455/412, 408, 455/415, 13.1, 430, 432, 436, 564, 565, 567, 572, 414; 379/127, 112, 115, 142, 188, 189, 196, 198, 201, 207, 222, 221, 225, 230

[56] References Cited

U.S. PATENT DOCUMENTS

| 5,063,591 | 11/1991 | Jodoin | 379/115 |
| 5,428,667 | 6/1995 | Easterling et al. | 379/59 |
| 5,526,403 | 6/1996 | Tam | 379/59 |
| 5,703,934 | 12/1997 | Zicker et al. | 379/61 |

FOREIGN PATENT DOCUMENTS

| 0462728A2 | 6/1991 | European Pat. Off. |
| 2130050 | 5/1984 | United Kingdom . |
| WO 96-11557 | 4/1996 | WIPO . |

OTHER PUBLICATIONS

I. Brini, C. Eynard, A. Gamba; "International Roaming in Digital Cellular Networks"; Proceedings of the International Switching Symposium, Yokohama, Japan; Oct. 25–30, 1992; Institute of Electronics Information and Communications Engineers; pp. 132–136.

Yen S —L., et al.: Intelligent MTS Monitoring System; Proceedings of the Annual International Carnahan Conference on Security Technology, Albuquerque, Oct. 12–14, 1994, No. Conf. 28, Oct. 12, 1994; pp. 185–187, XP000492127.

*Primary Examiner*—Wellington Chin
*Assistant Examiner*—Yemane Woldetatios
*Attorney, Agent, or Firm*—Jenkens & Gilchrist

[57] ABSTRACT

Billing identification numbers supplied to law enforcement agencies for monitored cellular calls are used to retrieve toll tickets generated by the cellular network. By processing the toll tickets, an identification may be made by the agency of the A-party to and routing of the monitored cellular call. Calling line identification (CLI) information is supplied to the monitoring law enforcement agency for each monitored call. The CLI information identifies the directory number of the A-party to the monitored cellular call when the A-party comprises another cellular subscriber. In those situations where the A-party comprises a wireline subscriber in a public switched telephone network (PSTN), the CLI information delivered to the monitoring law enforcement agency comprises either the calling line identification (CLI) information obtained over an integrated services user part (ISUP) trunk connection (identifying the wireline A-party), or converted A-number identification (ANI) information obtained over a non-ISUP trunk connection (identifying routing and switching information useful in tracing the call).

27 Claims, 4 Drawing Sheets

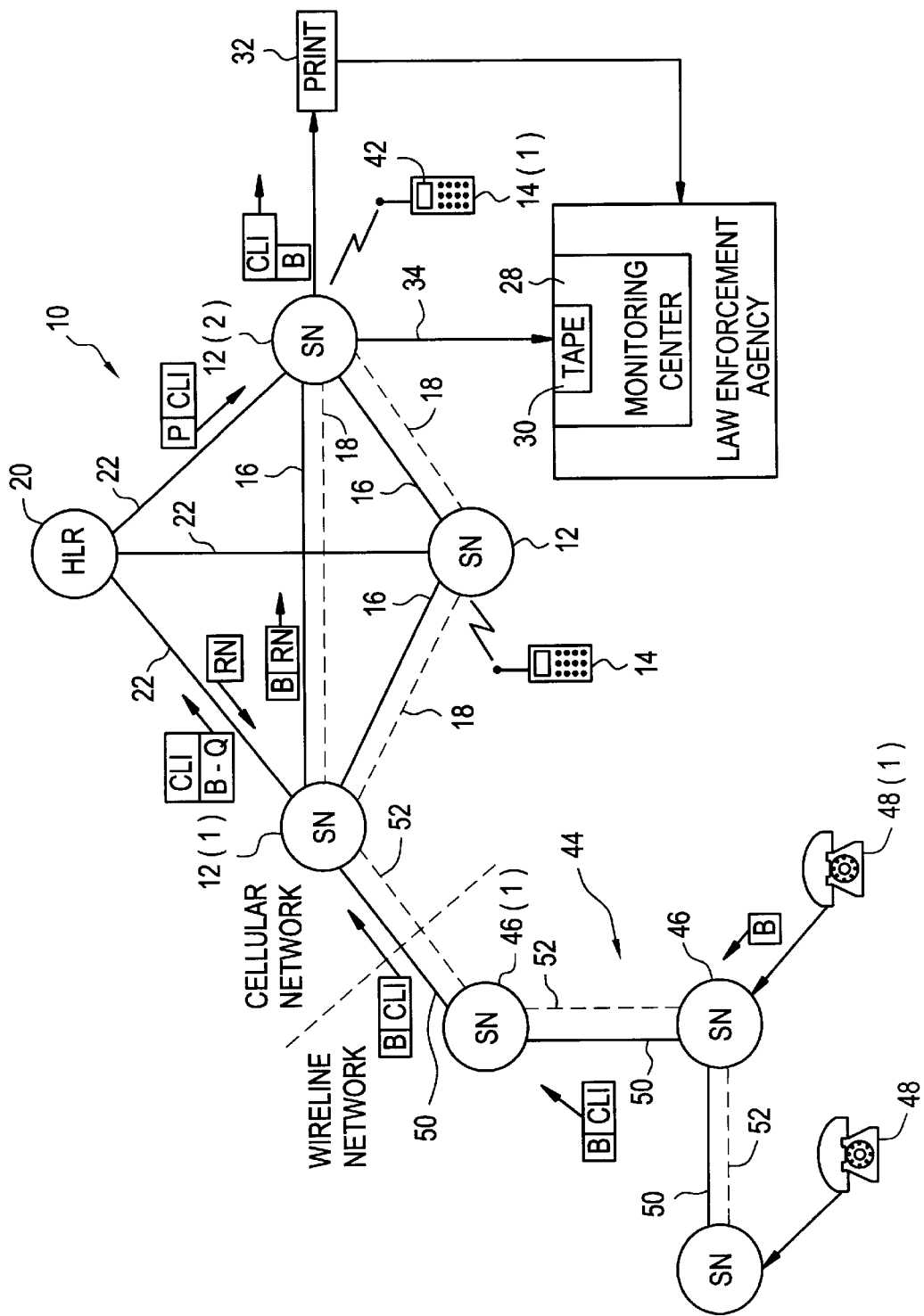

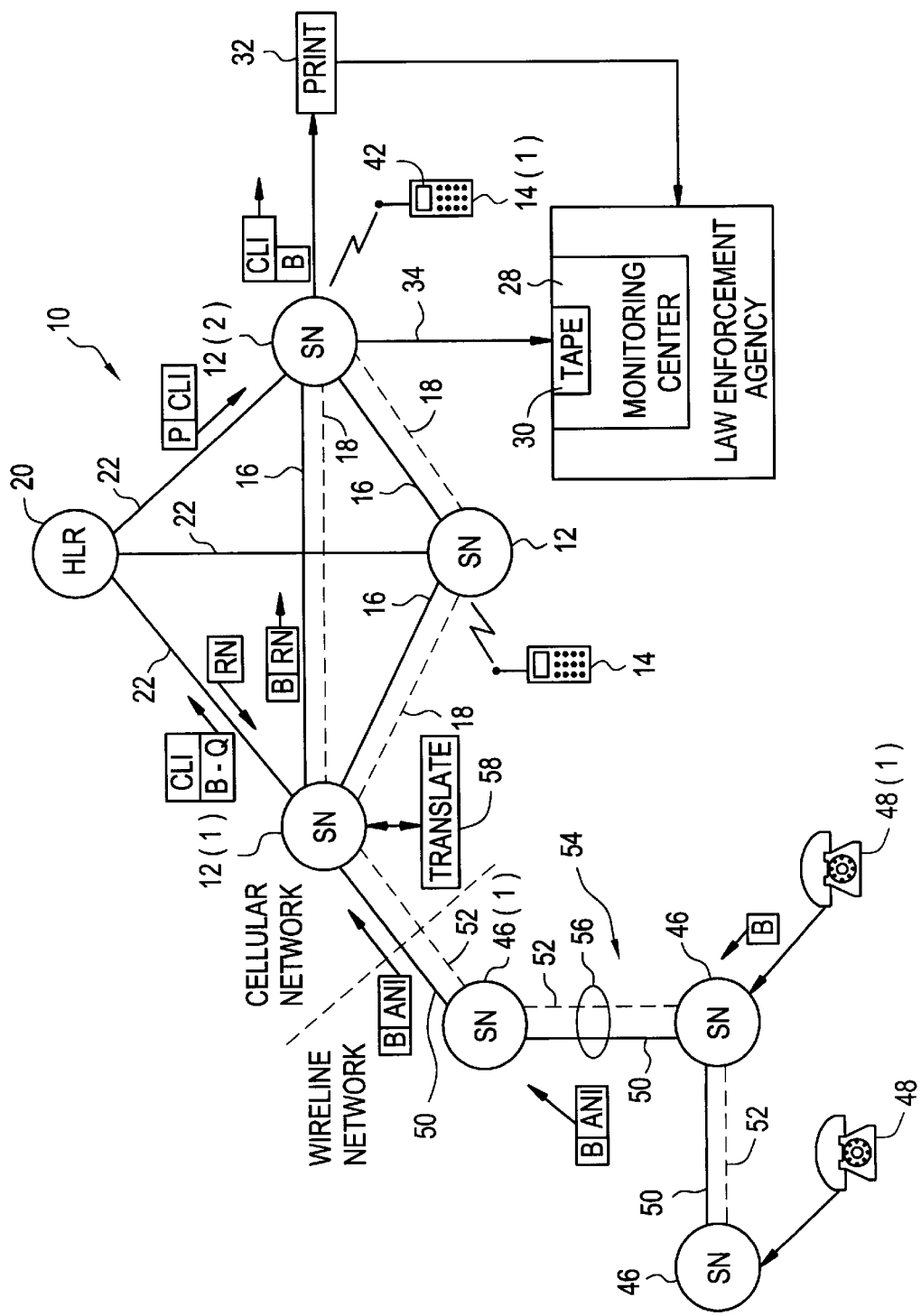

METHOD AND APPARATUS FOR FACILITATING LAW ENFORCEMENT AGENCY MONITORING OF CELLULAR TELEPHONE CALLS

BACKGROUND OF THE INVENTION

1. Technical Field of the Invention

The present invention relates to cellular telephone networks and, in particular, to the monitoring of cellular telephone calls by law enforcement agencies.

2. Description of Related Art

When law enforcement agencies are authorized to monitor telephone calls to obtain evidence for use in criminal investigations, perhaps the most important piece of information they obtain other than the recorded voice conversation itself is the identification of the parties participating in the call. In a conventional wireline telephone network, this information is readily accessible because a physical connection exists between the A-party (calling party) and the B-party (called party) to the call allowing the call to be traced, and because the communications protocols within the network support the transmission of party identification information like telephone numbers. Because of the lack of a physical connection and the limitations present in some communications protocols and switch operations, such party identification information is not so readily available during law enforcement agency monitoring of a cellular telephone call. The party identification problem is most prevalent with respect to being able to determine the identity of the A-party to the call.

The signaling protocols used between some telecommunications exchanges provide for the transmission of only two numbers in connection with the set-up of a cellular call. The first number comprises the actual telephone number of the B-party. The second number comprises a roamer number used to route the call within the cellular network. With space provided for only two numbers, there is no room within those signaling protocols for conveying the telephone number of the A-party to the cellular call. If the B-party is the party to be monitored, A-party information is then not typically made available to the monitoring law enforcement agency at the point where the telephone tap is made.

There is a need then during law enforcement agency monitoring of a cellular call for complete party identification information to be provided. In particular, there is a need to obtain information on the A-party to the monitored cellular call.

SUMMARY OF THE INVENTION

The present invention provides two methods for supplying law enforcement agencies with A-party identification information concerning a cellular telephone call. In the first method, a billing identification number for a monitored cellular call is made available to the monitoring law enforcement agency in connection with each monitored call. From this billing identification number, toll tickets generated by the nodes of the cellular network may be retrieved from the cellular service provider and processed to supply information useful in identifying the A-party to the monitored call and routing of that call. In the second method, calling line identification (CLI) information is supplied by the cellular network to the monitoring law enforcement agency for each monitored call. In those instances where the A-party comprises another cellular subscriber, the calling line identification information comprises the mobile telephone number for the calling subscriber. Conversely, in those instances where the A-party comprises a wireline subscriber in a public switched telephone network (PSTN), the validity of the calling line identification information depends on the nature of the PSTN. If the PSTN supports integrated services user part (ISUP) trunk connections, calling line identification (CLI) information (from the wireline ISUP trunk identifying the telephone number of the calling party) is imported into the cellular system and then provided to the monitoring law enforcement agency. If the PSTN network does not support ISUP trunk connections, transmitted A number identification (ANI) information (providing routing and switching information useful in tracing to the source of the call) is translated into calling line identification (CLI) information and provided to the monitoring law enforcement agency. In the latter case, the CLI information is restricted for use by and display to only the service provider and the monitoring law enforcement agency; no calling party identification services are provided to the mobile subscriber.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 4 is a block diagram of a portion of a cellular telephone network and first type public switched telephone network wherein calling line identification information is supplied to law enforcement agencies with respect to monitored cellular calls to identify a wireline A-party; and FIG. 5 is a block diagram of a portion of a cellular telephone network and second type public switched telephone network wherein calling line identification information is supplied to law enforcement agencies with respect to monitored cellular calls to identify a wireline A-party.

DETAILED DESCRIPTION OF THE DRAWINGS

Figure 1:
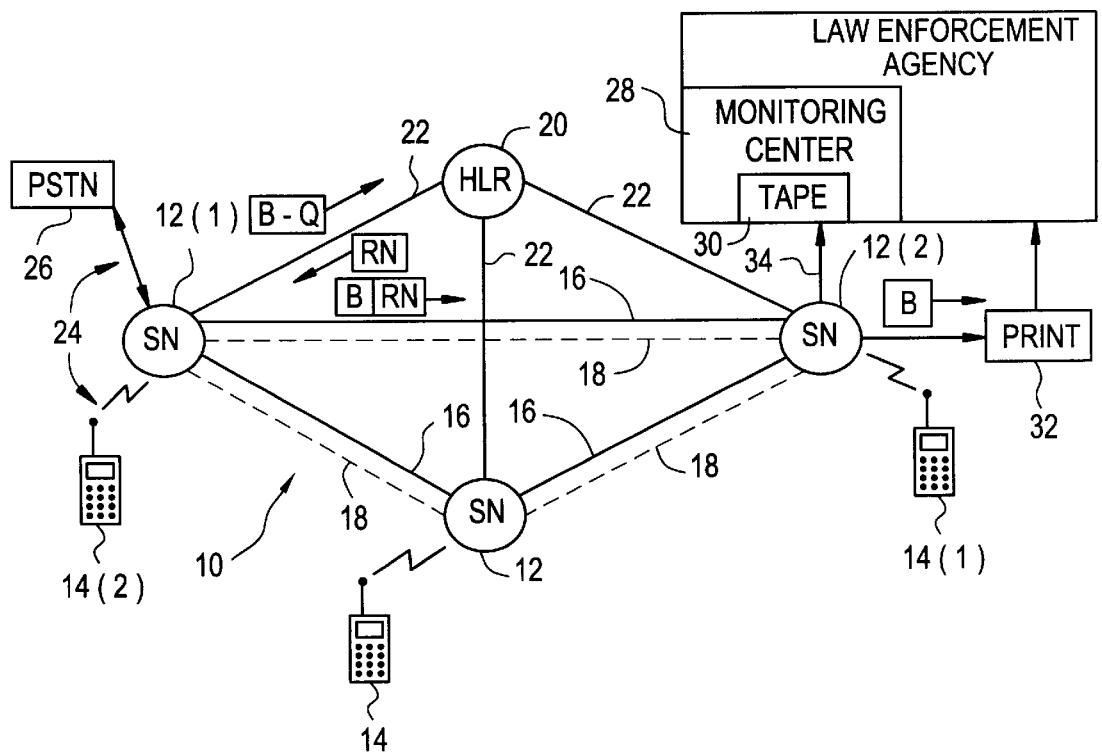
FIG. 1 is a block diagram of a portion of a cellular telephone network and a known method for law enforcement agency monitoring of cellular calls.

Reference is now made to FIG. 1 wherein there is shown a block diagram of a portion of a cellular telephone network 10 including a plurality of interconnected switching nodes (SN) 12. Although only three switching nodes 12 are shown, it will be understood that the network 10 likely includes many more interconnected nodes. The switching nodes 12 may comprise any one of a number of known telecommunications switching devices, including those commonly used and known in the art for providing either digital or analog cellular telephone service to a plurality of mobile station subscribers 14. The switching nodes 12 are interconnected for communication via both signaling links 16 (illustrated with solid lines) and voice trunks 18 (illustrated with broken lines). The voice trunks 18 provide voice and data communications paths used to carry mobile subscriber station 14 communications between the nodes 12. The signaling links 16 carry network communications signals between the nodes 12 that are used for controlling network operation. The switching nodes 12 are connected to a data base (DB) 20 (or perhaps to plural data bases if necessary) comprising, for example, a home location register (HLR) and/or visitor location register (VLR), by means of signaling links 22 (again illustrated with solid lines). The data base(s) 20 store information concerning the subscriber mobile stations 14 such as location information.

Assume now that a cellular call originates, as generally indicated at 24, with a calling party (A-party) who may comprise either another cellular subscriber (e.g., mobile station 14(2)) of the cellular telephone network 10, or a wireline subscriber (not shown) within the public switched telephone network (PSTN) 26. That call is further assumed to have been dialed to the directory telephone number (B-number) of a called mobile station subscriber 14(1). Following receipt of the call in an originating switching node 12(1) of the cellular network 10, the home location register data base 20 is queried with the dialed B-number to determine called subscriber location (signal B-Q). Responsive to the query, the data base 20 returns a roamer number (signal RN) identifying the switching node 12(2) that currently serves the called mobile station subscriber 14(1). The returned roamer number is then used by the originating switching node 12(1) to route the cellular call to the serving switching node 12(2), with the dialed B-number (B) then used to deliver the call to the mobile station subscriber 14(1). When the B-party is the party to be monitored, it will be noted that in either R1 or R2 signaling neither the B-number nor the roamer number transmitted through the cellular network 10 for purposes of call delivery provide any indication as to the identity of the A-party.

Law enforcement agencies are often authorized to monitor cellular telephone calls to obtain evidence for use in criminal investigations. To accomplish this goal, a monitoring center 28 is established which may include a tape recorder 30 for recording the voice conversation that is being monitored. The physical connection with the voice portion of the cellular telephone network 10 is made through a tap (generally shown at 34). The tap 34 may be made at any location within the cellular telephone network 10 in a manner well known to those skilled in the art, but is typically made at a selected one of the switching nodes 12 where the subscriber to be monitored is currently located (roaming).

Each switching node 12 further includes a local data printing device 32 for printing signaling and other call or network information and data related to a conversation (typically comprising, in accordance with the prior art, the B-number for the called mobile station subscriber 14(1). With the cooperation of the cellular service provider, this information may be provided to the law enforcement agency in connection with each monitored call. Unfortunately, in conventional signaling the identification information on the calling party (A-party) is not typically transmitted over the network 10, and is therefore not available to be printed at the local printer 30 and thereafter supplied to the monitoring law enforcement agency.

Figure 2:
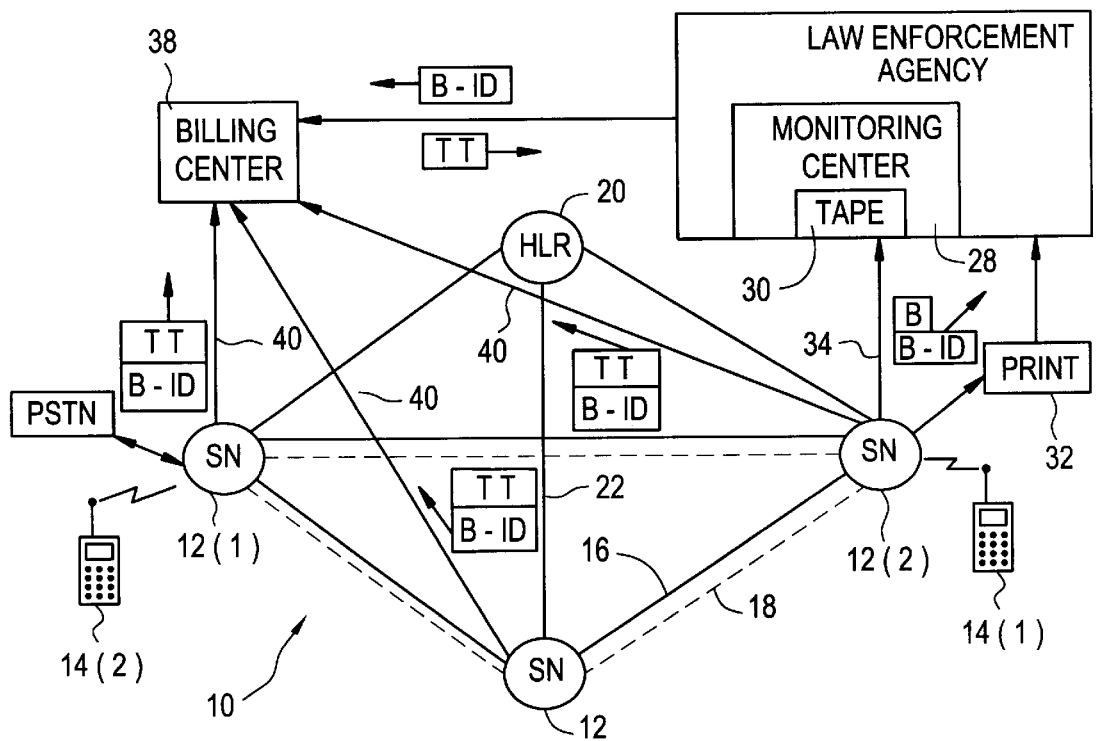
FIG. 2 is a block diagram of a portion of a cellular telephone network wherein cellular call billing identification information is supplied to law enforcement agencies with respect to monitored cellular calls.

Reference is now made to FIG. 2 wherein there is shown a block diagram of a portion of a cellular telephone network 10 similar to that shown in FIG. 1. Like reference numbers and designations in FIGS. 1 and 2 refer to like or similar network components. The network 10 further includes a billing center 38 connected to the switching nodes 12 via signaling links 40 (again illustrated with solid lines). As a cellular telephone call is routed through the network 10 during call set-up, and thereafter handled, each switching node 12 involved in the call generates several toll tickets (TTs) containing charging data relating to the ongoing cellular call. This charging data includes details concerning the call including an identification of the calling and called parties, party location information, routing information, switching information, and other call related information. In order to differentiate between the many cellular calls being handled, and to properly charge for each individual cellular telephone call, each call is assigned a unique billing identification number (B-ID). This billing identification number is provided along with the charging information in each toll ticket report sent by a switching node 12 to the billing center 38.

The law enforcement agency monitoring center 28 utilizes its tap 34 to physically connect to the network 10 and monitor the voice communication (which may be recorded for future use by tape recorder 30). The network data monitored and output to the local printer 32 includes not only the B-number for the called mobile station subscriber 14(1) (as known in the prior art), but also the billing identification number (B-ID) for that call. Using the reported billing identification number (B-ID) provided by the cooperating cellular service provider, the law enforcement agency may retrieve the toll tickets (TTs) for the monitored call from the billing center 38. This information is then processed by either the service provider (not shown) or the law enforcement agency (shown) to obtain additional information concerning the call including an identification of the calling and called parties, party location information, routing information, switching information, and other call related information.

Figure 3:
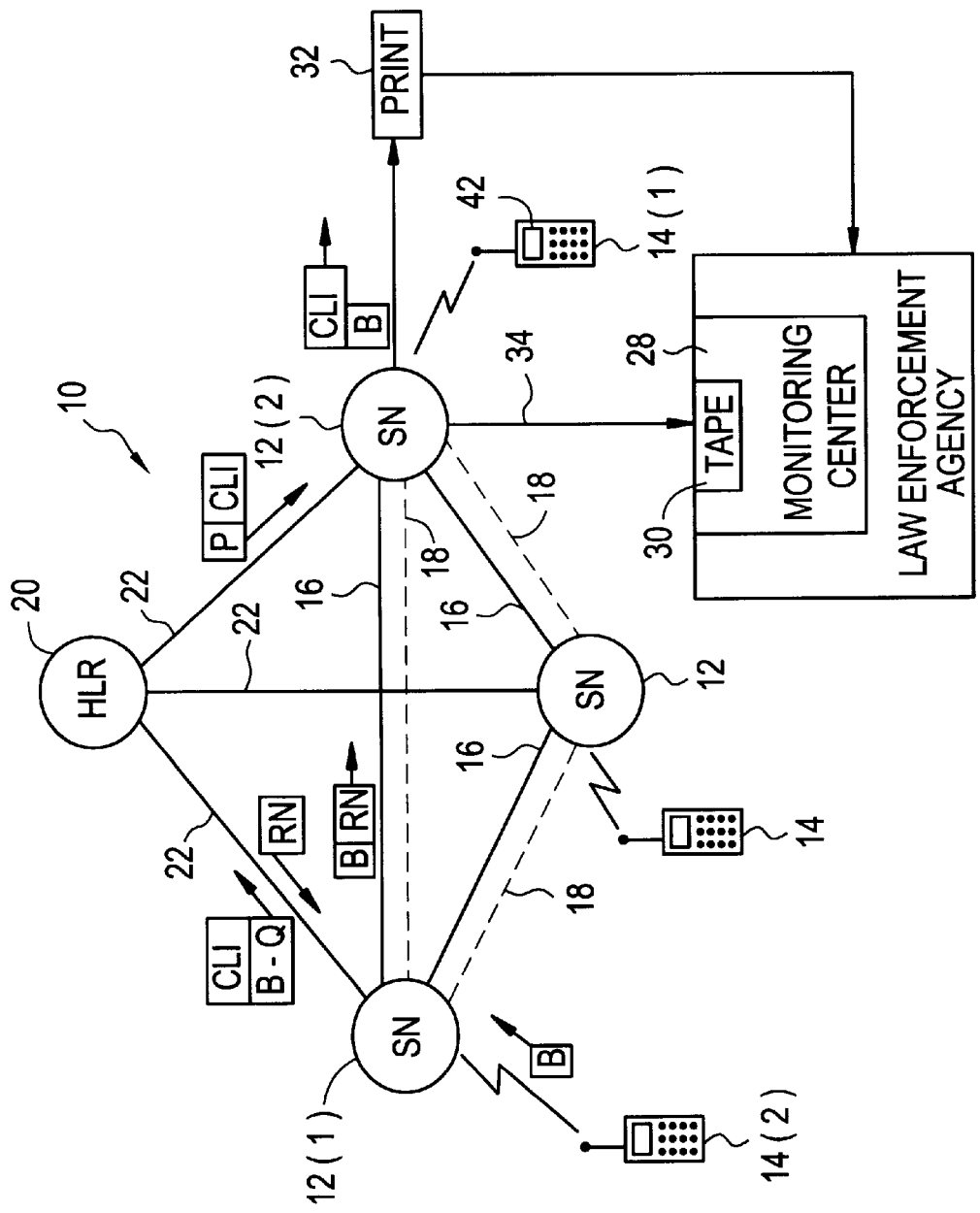
FIG. 3 is a block diagram of a portion of a cellular telephone network wherein calling line identification information is supplied to law enforcement agencies with respect to monitored cellular calls to identify a cellular A-party.

Reference is now made to FIG. 3 wherein there is shown a block diagram of a portion of a cellular telephone network 10 similar to that shown in FIG. 1. Like reference numbers and designations in FIGS. 1 and 3 refer to like or similar network components. A service feature now made available to mobile station subscribers 14 is caller identification where the identity of the calling party in a cellular telephone call is made available to the called subscriber and provided on a display 42 of the mobile station 14 concurrent with receipt of the call. To support this service, a calling line identification (CLI) field (populated with the telephone number of a calling mobile station party 14(2)) is included using IS-41 signaling within the B-number query transmitted to the home location register 20. The calling line identification field is then transmitted to the serving switching node 12(2) for the called party mobile station subscriber 14(1). If the called party mobile station subscriber 14(1) subscribes to the caller identification service feature, the information contained within the calling line identification field is then transmitted to the mobile station and displayed when the call is being set up.

The law enforcement agency monitoring center 28 utilizes its tap 34 to physically connect to the network 10 and monitor the voice communication (which may be recorded for future use by tape recorder 30). The network data monitored and output to the local printer 32 includes not only the B-number for the called mobile station subscriber 14(1) (as known in the prior art), but also the calling line identification field information for that call. The output calling line identification field information is then processed by either the service provider (not shown) or the law enforcement agency (shown) to obtain an identification of the calling party (provided that calling party comprises another mobile station subscriber 14) as well as other call related information.

If the cellular telephone call being monitored originates outside of the cellular network, calling party information may not be readily accessible for insertion into the calling line identification field. In such cases, any tapping of the cellular network 10 by law enforcement agencies in accordance with the procedure illustrated in FIG. 3 will typically fail to provide an indication of the identity of the calling party.

Reference is now made to FIG. 4 wherein there is shown a block diagram of a portion of a cellular telephone network 10 connected to a first type public switched telephone network (PSTN) 44. Like reference numbers and designations in FIGS. 1 and 4 refer to like or similar network components. The first type public switched telephone network 44 includes a plurality of interconnected switching nodes 46. Although only three switching nodes 46 are shown, it will be understood that the network 44 likely includes many more interconnected nodes. The switching nodes 46 may comprise any one of a number of known telecommunications switching devices, including those commonly used and known in the art for providing telephone service to a plurality of wireline subscribers 48. The switching nodes 46 are interconnected for communication via both signaling links 50 (illustrated with solid lines) and voice trunks 52 (illustrated with broken lines). The voice trunks 52 provide voice and data communications paths used to carry wireline subscriber 48 communications between the nodes 46. The signaling links 50 carry network communications signals between the nodes 46 used for controlling network operation. At least one of the switching nodes 46(1) is connected via a signaling link 50 and voice trunk 52 to one of the switching nodes 12(1) of the cellular telephone network 10.

For this first type public switched telephone network 44, it is assumed that the complete communications path between a calling wireline subscriber 48(1) and the originating switching node 12(1) of the cellular network 10 with respect to the call being monitored comprises an integrated services user part (ISUP) connection. In accordance with the ISUP protocols and the accompanying signaling system #7 (SS7) network signaling, a calling line identification (CLI) field (populated with the telephone number of the calling wireline subscriber 48(1)) is transmitted along with the call connection. This calling line identification information is received by the originating switching node 12(1) of the cellular network 10 and used to populate the calling line identification (CLI) field that is transmitted along with the B-number query within the cellular network 10 to the home location register 20.

The law enforcement agency monitoring center 28 utilizes its tap 34 to physically connect to the network 10 and monitor the voice communication (which may be recorded for future use by tape recorder 30). The network data monitored and output to the local printer 32 includes not only the B-number for the called mobile station subscriber 14(1) (as known in the prior art), but also the calling line identification field information for that call. From processing the calling line identification field information, the law enforcement agency (shown) or the service provider (not shown) may obtain an identification of the calling wireline subscriber 48(1) as well as other call related information.

Reference is now made to FIG. 5 wherein there is shown a block diagram of a portion of a cellular telephone network 10 connected to a second type public switched telephone network (PSTN) 54. Like reference numbers and designations in FIGS. 1, 4 and 5 refer to like or similar network components. For the second type public switched telephone network 54, it is assumed that the communications path between a calling wireline subscriber 48(1) and the originating switching node 12(1) of the cellular network 10 with respect to the call being monitored includes at least one non-integrated services user part (ISUP) trunk connection, as generally indicated at 56. Such a connection may comprise, for example, either an R1 or R2 trunk connection. In accordance with the R1/2 trunk and signaling protocols, an A-number identification (ANI) field (populated with routing and switching information useful in tracing the call back to the calling wireline subscriber 48(1)) is transmitted along with the call connection. This A-number identification information is received by the originating switching node 12(1) of the cellular network 10, processed by a translator functionality 58, and used as translated to populate the calling line identification (CLI) field that is transmitted to the home location register 20 with the B-number query.

The law enforcement agency monitoring center 28 utilizes its tap 34 to physically connect to the network 10 and monitor the voice communication (which may be recorded for future use by tape recorder 30). The network data monitored and output to the local printer 32 includes not only the B-number for the called mobile station subscriber 14(1) (as known in the prior art), but also the calling line identification field information (comprising the translated A-number identification) for that call. From processing the routing and switching information contained within the calling line identification field, the law enforcement agency (shown) or the service provider (not shown) may obtain (perhaps through use of a tracing operation) an identification of the calling wireline subscriber 48(1) as well as other call related information.

Use of the calling line identification field in a cellular network 10 is strictly limited. In accordance with such use restrictions, the calling line identification field cannot be populated with calling party identifying information unless the information is generated within the cellular network 10 (i.e., the calling party is another mobile station subscriber 14), or unless the information is received as calling line identification information (i.e., the calling party is completely connected to the cellular network 10 by means of an ISUP trunk connection). This is because the calling line identification information is displayed to mobile station subscribers subscripted to the caller identification service feature. To prevent the display of calling line identification information obtained from translated PSTN A-number identifications in accordance with the procedure illustrated in FIG. 5, the calling line identification (CLI) field transmitted through the cellular system 10 in accordance with FIGS. 3–5 includes an additional use authorization parameter (P). When this parameter is set, the calling line identification comprises a translated A-number identification. Responsive to such an indication in the parameter, the service switching node 12(2) restricts use of and access to the included information to the monitoring law enforcement agency only. No information about the call and the calling party thereto is then output to the display of the called mobile station subscriber 14(2) who is subscripted to the calling party identification service feature.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for obtaining A-number identification information for a law enforcement agency monitored cellular telephone call, comprising the steps of:

outputting information contained within a calling line identification field transmitted through a cellular telephone network in connection with the monitored cellular telephone call;

processing the calling line identification information to obtain an identification of the A-number for the monitored cellular telephone call, and transmitting a use authorization parameter for indicating that the information contained in the calling line identification field is to be used solely for law enforcement monitoring.

2. The method of claim 1 wherein the calling line identification information includes the A-number for the monitored cellular telephone call.

3. The method of claim 1 wherein the calling line identification information includes routing and switching information, and the step of processing further includes the step of processing the routing and switching information to trace the monitored cellular telephone call back to the A-number.

4. The method of claim 1 wherein the monitored cellular telephone call originates within the cellular telephone network.

5. The method of claim 1 wherein the monitored cellular telephone call originates in a public switched telephone network external to the cellular telephone network.

6. The method of claim 5 wherein the monitored cellular telephone call is carried in the public switched telephone network by integrated services user part trunk connections supporting transmission of calling line identification information, further including the step of passing the calling line identification information through from the public switched telephone network to the cellular telephone network.

7. The method of claim 5 wherein the monitored cellular telephone call is carried in the public switched telephone network by at least one non-integrated services user part trunk connection supporting transmission of A-number identification information, further including the step of translating the transmitted A-number identification information associated with the monitored call into the calling line identification information transmitted through the cellular telephone network.

8. The method of claim 7 wherein the translated A-number identification information includes routing and switching information, and the step of processing further includes the step of processing the routing and switching information to trace the monitored cellular telephone call back to the A-number.

9. In a telephone network including a cellular telephone network connected to a public switched telephone network, a system for monitoring cellular telephone calls, comprising:

a tap connected to a certain one of a plurality of interconnected cellular network switching nodes involved in the handling of a law enforcement agency monitored cellular telephone call;

a tape recorder connected to the tap for recording a conversation comprising the monitored cellular telephone call;

a local printer connected to the certain cellular network switching node; and means associated with the certain switching node for outputting to the local printer information contained within a calling line identification field transmitted through the cellular network in association with the monitored cellular telephone call, the information contained in the calling line identification being useful in obtaining an identification of the A-number for the monitored cellular telephone call, and for outputting a use authorization parameter for indicating that the information contained in the calling line identification field is to be used solely for law enforcement monitoring.

10. The system of claim 9 wherein the means further outputs to the local printer a B-number identification for the monitored cellular telephone call in addition to the calling line identification information.

11. The system of claim 9 wherein the calling line identification information includes the A-number for the monitored cellular telephone call.

12. The system of claim 9 wherein the calling line identification information includes routing and switching information useful in tracing the monitored cellular telephone call back to the A-number.

13. The system of claim 9 wherein the monitored cellular telephone call originates within the cellular telephone network.

14. The system of claim 9 wherein the monitored cellular telephone call originates in the public switched telephone network.

15. The system of claim 14 wherein the monitored cellular telephone call is carried in the public switched telephone network in whole by integrated services user part trunk connections supporting transmission of calling line identification information, an originating one of the cellular network switching nodes passing the calling line identification information through to the cellular network for output to the printer.

16. The system of claim 14 wherein the monitored cellular telephone call is carried in the public switched telephone network in part by non-integrated services user part trunk connections supporting transmission of A-number identification information, the system further including means associated with an originating one of the cellular network switching nodes for translating the transmitted A-number identification information into the calling line identification information transmitted through to the cellular network.

17. The system of claim 16 wherein the translated A-number identification information includes routing and switching information useful in tracing the monitored cellular telephone call back to the A-number.

18. A method for obtaining A-number identification information for a law enforcement agency monitored cellular telephone call, wherein the monitored cellular telephone call is carried by at least one non-integrated services user part trunk connection supporting transmission of A-number identification information, comprising the steps of:

receiving at a cellular telephone network A-number identification information associated with the monitored call, said A-number identification information transmitted over said at least one non-integrated services user part trunk connection;

translating the transmitted A-number identification information associated with the monitored call into calling line identification information;

transmitting the calling line identification information through the cellular telephone network in a calling line identification field and including a use authorization parameter for indicating that the information contained in the calling line identification field is to be used for law enforcement monitoring;

outputting information contained within a calling line identification field transmitted through the cellular telephone network to the law enforcement agency in connection with the monitored cellular telephone call; and processing the calling line identification information to obtain an identification of the A-number for the monitored cellular telephone call.

19. The method of claim 18 wherein the calling line identification information includes the A-number for the monitored cellular telephone call.

20. The method of claim 18 wherein the calling line identification information includes routing and switching information, and the step of processing further includes the step of processing the routing and switching information to trace the monitored cellular telephone call back to the A-number.

21. The method of claim 18 wherein the monitored cellular telephone call originates in a public switched telephone network external to the cellular telephone network.

22. The method of claim 18 wherein the translated A-number identification information includes routing and switching information, and the step of processing further includes the step of processing the routing and switching information to trace the monitored cellular telephone call back to the A-number.

23. In a telephone network including a cellular telephone network connected to a public switched telephone network, a system for monitoring cellular telephone calls originating in the public switched telephone network wherein the monitored cellular telephone call is carried in the public switched telephone network in part by at least one non-integrated services user part trunk connection supporting transmission of A-number identification information, comprising:

a plurality of interconnected cellular network switching nodes, wherein an originating one of the cellular network switching nodes receives A-number identification information transmitted by said at least one non-integrated services user part trunk connection and translates the A-number identification information into calling line identification information carried through the cellular network in a calling line identification field and including a use authorization parameter for indicating that the information contained in the calling line identification field is to be used for law enforcement monitoring;

a tap connected to a certain one of the plurality of interconnected cellular network switching nodes involved in the handling of a law enforcement agency monitored cellular telephone call;

a tape recorder connected to the tap for recording a conversation comprising the monitored cellular telephone call;

a local printer connected to the certain cellular network switching node; and means associated with the certain switching node for outputting to the local printer information contained within a calling line identification field transmitted through the cellular network in association with the monitored cellular telephone call, the information contained in the calling line identification being useful in obtaining an identification of the A-number for the monitored cellular telephone call.

24. The system of claim 23 wherein the means further outputs to the local printer a B-number identification for the monitored cellular telephone call in addition to the calling line identification information.

25. The system of claim 23 wherein the calling line identification information includes the A-number for the monitored cellular telephone call.

26. The system of claim 23 wherein the calling line identification information includes routing and switching information useful in tracing the monitored cellular telephone call back to the A-number.

27. The system of claim 23 wherein the translated A-number identification information includes routing and switching information useful in tracing the monitored cellular telephone call back to the A-number.

* * * * *